United States Patent Office.

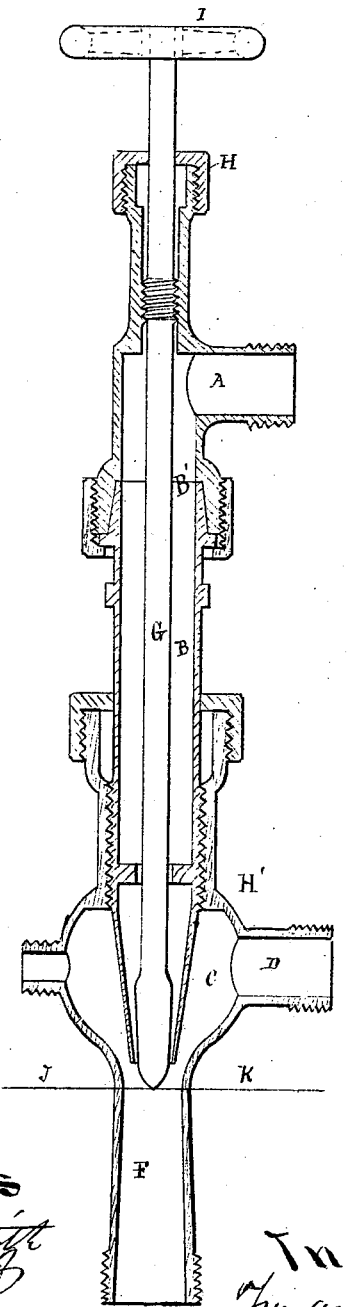

FRANCIS SCHLEIFER, OF SAN FRANCISCO, CALIFORNIA.

Letters Patent No. 108,732, dated October 25, 1870.

IMPROVEMENT IN REFINING SUGAR BY STEAM.

The Schedule referred to in these Letters Patent and making part of the same.

*To all whom it may concern:*

Be it known that I, FRANCIS SCHLEIFER, of San Francisco, in the county of San Francisco and State of California, have invented an Improved Method for Tempering Steam in Refining Sugars and Liquids; and I do hereby declare that the following is a full and exact description of the same, reference being had to the accompanying drawing and to the letters of reference marked thereon.

The nature of my invention consists in combining, by means of a suitable apparatus, atmospheric air with the steam, so that the temperature of the steam employed can be raised or lowered, or used at a constant and even degree of heat.

In the process of refining sugars the steps necessary are—

First, melting the raw sugar.
Second, the blow-up process.
Third, filtering through bags and animal bone-black.
Fourth, boiling the liquor in vacuum-pans.
Fifth, separating the molasses from the crystals in centrifugals, or by claying, &c.

The raw sugar is usually melted with about thirty (30) per cent. of water by means of steam, and this part of the process is one of great importance, and requires great care and skill, in order to prevent the cane from being converted into fruit-sugar, (so called.) Usually the temperature of the steam employed is at least 230° Fahrenheit, which is caused to come in direct contact with the sugar, which must necessarily partially destroy the power of crystallization and lessen the product of crushed sugar (mostly cane sugar) sought to be obtained, by reason of the immediate contact of steam at so high a degree of temperature, and the same unfavorable result is arrived at by using the steam in a direct manner in the "blow-up."

In these two processes from two to four per cent., and even more, of cane-sugar is converted into fruit-sugar, according to the quality of the raw material to be treated.

To avoid such a considerable loss I employ a steam-regulator, connected at a suitable place to the steam conducting-pipe.

To enable others skilled in the art or science to which it most nearly appertains to make and use my invention, I will proceed to describe fully its construction and operation.

In the annexed drawing the figure represented is a sectional elevation.

A is the steam conducting-pipe, leading into the pipe B.

The pipe B terminates in a globe-chamber, C, and can be raised and lowered by means of the screw-coupling and nut so as to effect a greater or lesser vacuum in the globe-chamber and regulate the volume or quantity of atmospheric air received or admitted to the globe-chamber through the air-pipe D, according to the distance from the line J K, and for this purpose the steam-pipe is connected to the pipe B by a ground joint, B'.

The globe-chamber terminates in the pipe F, which leads to the melting-pan or other vessel.

G is a piston passing through the stuffing-box H and guide H', the lower end of which passes through the conical end of the steam-pipe B, and the upper end is provided with a hand-wheel, I, which raises or lowers the end of the piston from its seat, and admits a greater or lesser quantity of steam into the globe-chamber to commingle with the atmospheric air from the pipe D.

A suitable gauge may be attached to the opposite side of the globe-chamber by a screw-coupling.

By this device it will be seen that the temperature of the steam employed can be easily regulated by the admission of atmospheric air, which not only effects this purpose alone, but oxidizes the coloring matter, and assists in coagulating the albuminous and glutinous substances found in sugars, and assists greatly in clarification.

Having thus described my invention,

What I claim, and desire to secure by Letters Patent, is—

1. The method described of regulating the temperature of steam employed in refining sugar, liquids, and sirups, by the introduction of atmospheric air with the steam, substantially in the manner and for the purpose described.

2. The pipes A and B, connected by the ground-joint B' and the screw-coupling H', the latter being adapted to raise or lower the pipe B, substantially as and for the purpose described.

In witness whereof, I have hereunto set my hand and seal.

FRANCIS SCHLEIFER. [L. S.]

Witnesses:
C. W. M. SMITH,
DAVID R. SMITH.